United States Patent Office 3,145,985
Patented Aug. 25, 1964

3,145,985
VEHICLE SUSPENSION DEVICES
Christian-Marie-Lucien-Louis Bourcier de Carbon, 64
Blvd. Maurice-Barres, Neuilly-sur-Seine, France
Filed July 26, 1962, Ser. No. 212,590
Claims priority, application, France, Sept. 7, 1961,
872,600, Patent 1,307,946
5 Claims. (Cl. 267—64)

This invention relates to resilient suspension devices and more particularly to means for compensating for variations in load in such devices. These devices find utility in many types of installation including vehicle suspensions, seat supports, and the like.

The general object of the invention is the provision of a novel and improved compensatable suspension device of the class described which is simple and economical in construction and operation, and which can be used alone or in combination with a shock absorber or other suspension means whether mechanical or utilizing fluid pressure.

The invention is applicable in particular to automotive vehicles and when so utilized serves to maintain the elevation of the vehicle chassis or body at a mean or average height above the ground, the device being preferably pneumatic and requiring a source of compressed gas, such as an air compressor or a supply tank of compressed air or gas.

In one of its utilizations, the invention is associated with an energy-dissipating shock absorber, such as a tubular direct-acting shock absorber, one usually being installed in association with each wheel, in automotive usage. In this case the invention contemplates the provision of a very simple arrangement adapted to impart to the shock absorber on the one hand the role of a distributor of the compressed air from the source of supply, and on the other hand, the role of a pneumatic spring designed to withstand at least partially any variations of the load.

One important feature of the invention is the provision of a pneumatic load compensating device in conjunction with the other suspension means, the over-all arrangement being such as to require only a relatively low compressed air pressure. This permits the use of a relatively simple compressor of low cost, a simplification of the packing means for the compensator, and a reduction in the power demand on the motor of the vehicle.

Other objects and features of novelty will be apparent from the following specification when read in connection with the accompanying drawings in which certain embodiments of the invention are illustrated by way of example.

In the drawings:

FIGURE 1a is a view in vertical section of a shock absorber and compensator device embodying the principles of the invention;

FIGURE 1b is a fragmentary view in vertical section of one portion of a modified form of the construction shown in FIGURE 1a;

FIGURE 2a is a more or less schematic representation in vertical section of a compensator which does not have a built-in shock absorber;

FIGURE 2b is a fragmentary view in vertical section of a modification of the device of FIGURE 2a;

Figure 1:
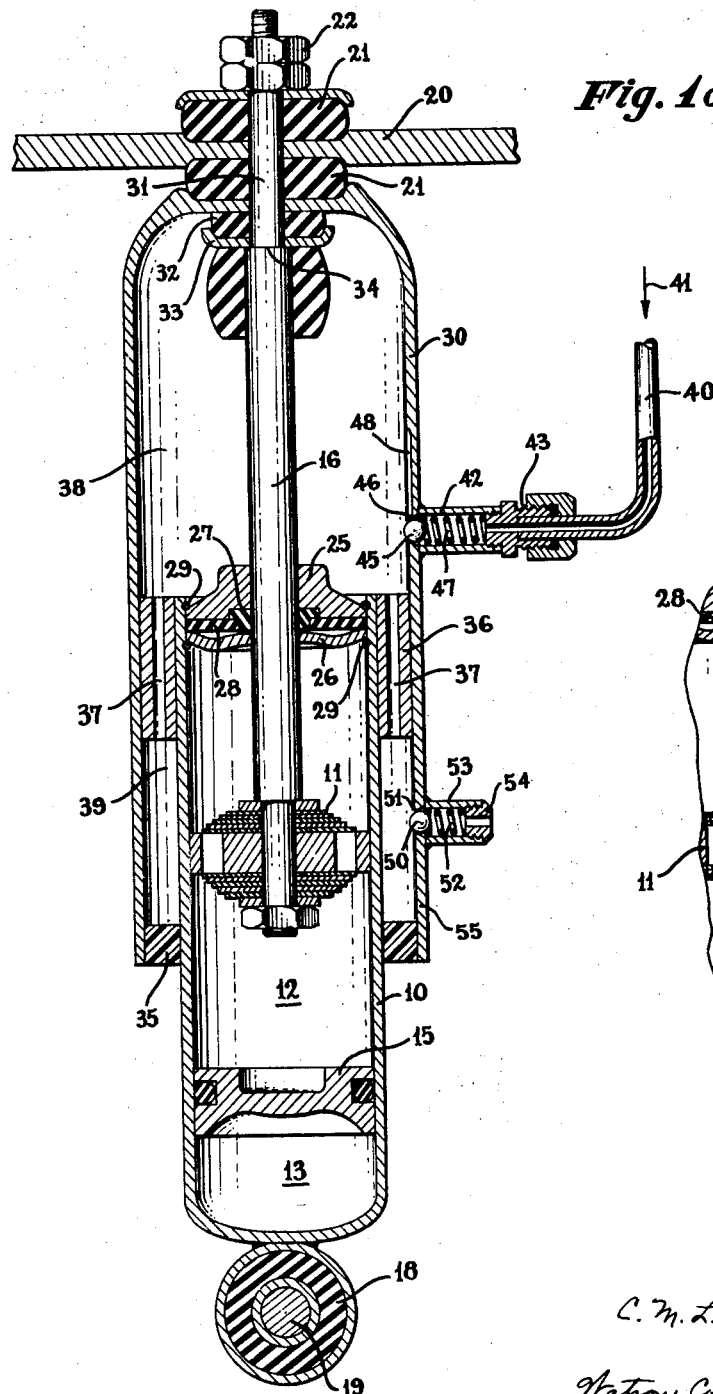

In FIGURE 1a of the drawings where the device is embodied in the construction of a hydro-pneumatic shock absorber, the shock absorber itself comprises a tubular casing 10 within which a piston 11 is adapted to move. The piston 11 is of generic construction and illustrated diagrammatically here to suggest compression and rebound passageways controlled by disc valving. The piston moves within a body of damping liquid contained in the chamber 12 and a compensating chamber 13, set off at the lower end of the casing 10 by means of the floating piston 15, contains a body of compressed gas which compensates for the entrance of successive portions of the piston rod 16 into the working chamber 12.

The lower end of the casing 10 may be secured to one of the members, the relative movement of which is to be damped, for example, the wheel mounting of a motor vehicle, and the connection is accomplished by means of the eye 18, which surrounds a stud forming a part of the wheel mounting 19.

At the upper end of the device the piston rod passes through an opening in the chassis or body frame member 20 and is resiliently mounted therein as by means of the rubber washers 21, the arrangement being secured by means of the nuts 22 screwed upon the upper end of the piston rod 16.

Means for packing the rod 16 as it enters the working chamber 12 of the casing 10 include the outer retainer block 25 and the inner retainer disc 26, between which is sandwiched the seal member 27 and the seal pressing washer 28. The sealing device is held firmly within the end of the cylinder 10 as by means of the split snap rings 29.

The shock absorber thus broadly presented functions in a similar manner to other shock absorbers of this same general type.

The shock absorber cylinder or casing 10 is received within a tubular outer shell or casing 30 which is supported upon the attenuated portion 31 of the piston rod 16 and clamped as by means of the same nuts 22, between the washer 21 and an inner rubber washer 32, the latter being supported by a metallic washer 33 resting upon the shoulder 34 of the piston rod.

The shock absorber casing 10 slides within the casing 30 and is packed by means of the sealing ring 35 disposed at the lower end of the casing or shell 30.

A sleeve 36 is secured externally to the upper end of the shock absorber casing 10 and has a sliding fit within the shell or casing 30 and is provided with passageways 37 through which compressed air or gas may flow from one side of the sleeve 36 to the other, that is to say, from the air chamber portion 38 to the portion 39 and vice versa.

A pipe line 40 leads from a compressor or other source of compressed air or gas as indicated by the arrow 41. The pipe 40 connects with a tubular protuberance 42 mounted upon the outer wall of the shell or housing 30 and is packed therein by means of the packed joint structure 43.

An opening 46 is formed in the wall of the housing 30 and is preferably of conical section and provides a valve seat for the ball valve 45 carried within the hollow protuberance 42. A coil spring 47 urges the valve toward seated position. A groove 48 is formed in the inner wall of the housing 30.

As an outlet from the air chamber 39 a valve device is provided which comprises the ball valve 50 seated within an opening 51 in the wall of the casing 30 and urged toward closed position by the coil spring 52 carried within the tubular protuberance 53 secured to the outer wall of the housing 30. A pierced plug 54 is threaded into the outer end of the protuberance and serves to back up the spring. The shallow groove 55 extends downwardly from the opening 51 in the inner wall of the housing 30.

Now the dual compressed air compartment 38, 39 is of variable size depending upon the degree of entrance of the shock absorber cylinder 10 within the shell 30 of the gas cylinder and it is easy to see that the shock absorber cylinder 10 tends to be forced out of the shell 30 with an elastic force $F=pS$; S being the outside cross-section of the shock absorber tube 10, and $p$ the pressure of the compressed air or gas within the chamber 38, 39. Whenever the shock absorber is forced an excessive distance into the cylinder or casing 30, the upper end of the sleeve 36 displaces the valve 45 against the urging of the spring 47 and the pressure of the compressed fluid in the pipe 40 permits the gas pressure in the chamber 38, 39 to increase. Entrance of the fluid, should the sleeve 36 pass upwardly beyond the valve 45, is assured by the groove 48. Then the pressure $p$ increases within the chamber until the force F is sufficient to move the shock absorber tube downwardly and bring it into the mean or average position upon which the valve 45 is again automatically closed either by the pressure of the gas in the pipe 40 or the spring 47. It is obvious that the spring 47 need be only a weak one or under certain circumstances could be eliminated entirely and dependence placed entirely on the pressure of the gas.

The relief valve 50 in the lower portion of the wall of the cylinder 30 permits air to escape from the cylinder 30 when the shock absorber tube 10 emerges too far from the cylinder 30. This occurs when the sleeve 36 dislodges the valve 50 against the urging of the coil spring 52. This initiates a lowering of the pressure within the chamber 38, 39 until the shock absorber tube 10 returns to mean position, the valve 50 then automatically being closed.

A modification of the relief valving arrangement is shown in FIGURE 1b of the drawings in which the valve 50 and its associated structure is eliminated and a groove 60 cut in the outer wall of the shock absorber casing 10 and of such dimension that relief of the gas from the chamber 39 occurs when the lower end 61 of the groove 60 protrudes beyond the lower edge of the packing ring 35 at the end of the casing 30.

Figure 2:
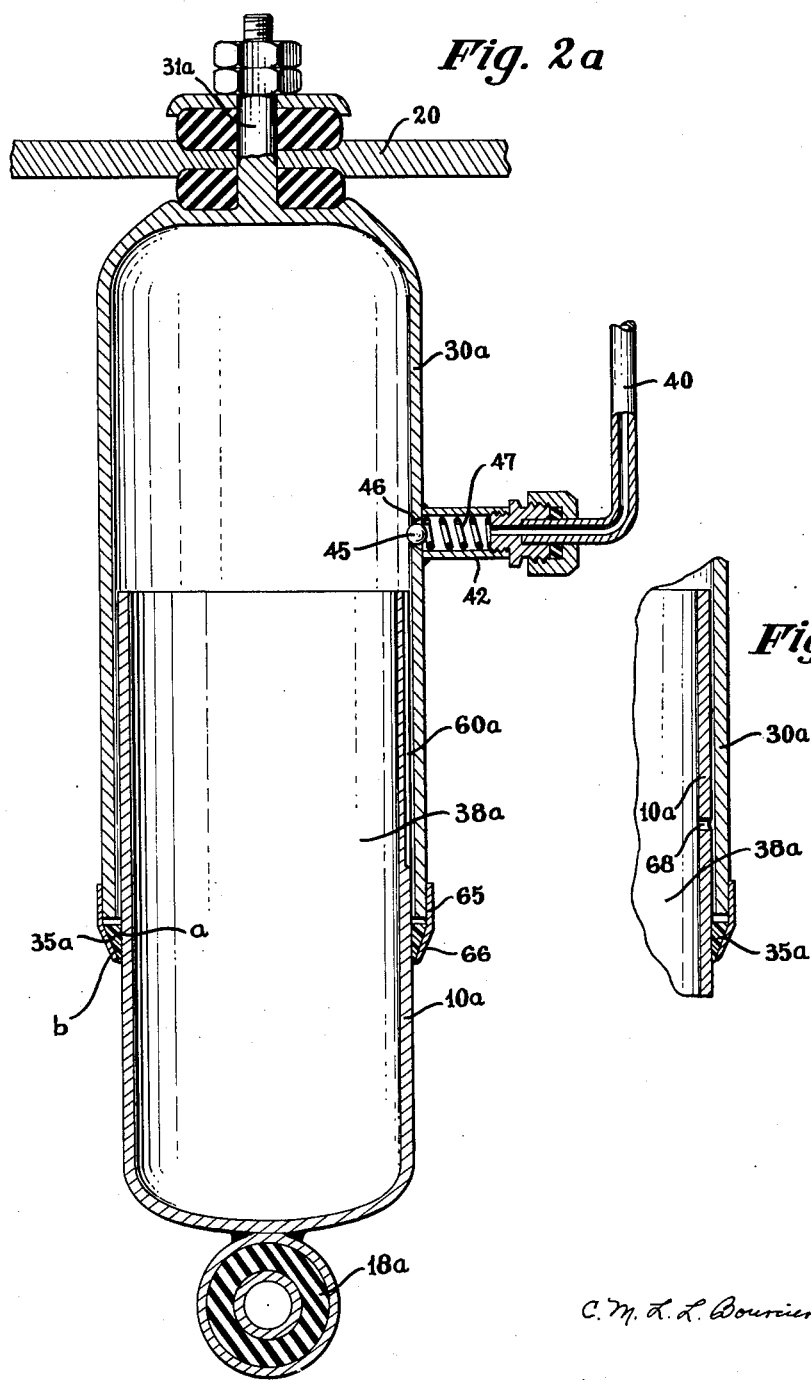

In FIGURE 2a of the drawings a simplified arrangement is provided wherein an outer cylindrical casing 30a receives an inner similarly shaped casing 10a and this device may be used either with or without the provision of shock absorber means. The outer cylinder 30a may be secured to the chassis or body 20 by means of a stem 31a in a similar manner to the extension 31 of the piston rod 16 of the previously described device. Similarly, the eye 18a serves to connect the lower telescoping cylinder 10a with the wheel mounting. The inlet valving is exactly the same as in the case of the structure of FIGURE 1a, the valve 45 seating in an opening 46 and being pressed by a spring 47 contained within the tubular protuberance 42 into which enters the end of the pipe 40 leading from the source of compressed gas or air.

An annular ring 65 preferably made of sheet metal and tapered conically as at 66 is secured at the lower end of the outer casing 30a and serves to retain the packing ring 35a which is of triangular section. Thus, one side $a$ of the triangular section of the ring 35a is applied against the outer wall of the tube 10a and the hypotenuse $b$ fitting snugly against the inside of the conical flange 66 of the ring 65. Under these conditions, the gaseous pressure acting within the chamber along the slight space between the two cylindrical members 10a and 30a contributes to insuring the tightness of the packing between the ring 35a between the respective tubular members 10a and 30a. The ring 65 may be fitted to the lower end of the outer casing 30a by a simple force fit and the packing ring 35a may be made of plastic material of somewhat greater rigidity than ordinary rubber, for example, Teflon (tetrafluorethylene), Rilsan (graphite polyamide), or Vulcollan (polyurethane).

In the embodiment shown in FIGURE 2a the release of excess air when the cylinder 10a is extended too far with respect to the cylinder 30a, may be permitted by means of the groove 60a formed in the outer wall of the cylinder 10a and functioning in exactly the same manner as the groove 60 of FIGURE 1b.

An alternative pressure release arrangement is shown in FIGURE 2b of the drawings in which the inner cylinder 10a is provided with a single opening 68 which, when the opening passes beyond the lower edge of the packing ring 35a permits the escape of pressure fluid from the interior 38a of the cylinder 10a.

From the foregoing, it follows that such a device actually constitutes a pneumatic height correcting spring device. Associated with a source of compressed air which provides a sufficient pressure, it could itself assure the total suspension of the chassis 20 on the wheel carrying frame. However, this solution raises difficult technical problems in view of high pressures required. This is why a better solution consists in combining with the described device a conventional suspension means, for example, a suspension employing metal springs which would be sufficient to support the weight of the car without load, so as to entrust to the device provided by the present invention only the variable portion of the total load, that is to say, the fraction in excess above the weight of the empty vehicle, which makes it possible to accomplish the results with substantially lower pressures. Such a combination furthermore has an appreciable advantage in safety of operation, since the vehicle due to the provision of the metal springs, retains sufficient suspension to travel under acceptable conditions even in case of a complete failure of the source of compressed air for the novel compensated suspension component.

However, it is important to combine the automatic load compensating device with an over-all arrangement which requires only a relatively low air or gas compression, this contributing to the attainment of the objects already mentioned of being able to employ a simple low-priced compressor, maintain the tightness of the packing 35 and 35a, and decrease the extraction of power from the motor for the operation of the compressor. For efficient operation of the suspension and the attainment of maximum riding comfort, it is necessary to have as little friction as possible in connection with the packing 35 and 35a against the shock absorber tube 10 or the casing 10a of the embodiment of FIGURE 2a. This of course necessitates a relatively low pressure of gaseous fluid. If high pressure gas were used, it would be necessary to provide a packing joint 35 which is quite tight and secure and therefore one which presents a high frictional force; that is to say, if one does not want to consume too much power, since for a given degree of looseness of the joint 35, the energy dissipated by air leakage increases extremely rapidly with the pressure. If, on the other hand, the pressure employed is quite low, one could employ a sealing joint 35 of low clamping force and low friction, and even if such a joint or packing is not absolutely tight, since in such a case the energy consumed by the presence of slight leakage remains relatively small.

The most acceptable and favorable arrangement for reducing to the lowest possible value the compressed air pressure necessary to compensate for the variations in load consists in associating within the above described devices in accordance with the invention, a second pneumatic spring which freely communicates with the compartments 38, 39 of the compensated suspension member, such a spring adding its supporting and low variation compensating effect to that of the device as, for example, as shown in FIGURES 1a and 2a.

Figure 3:
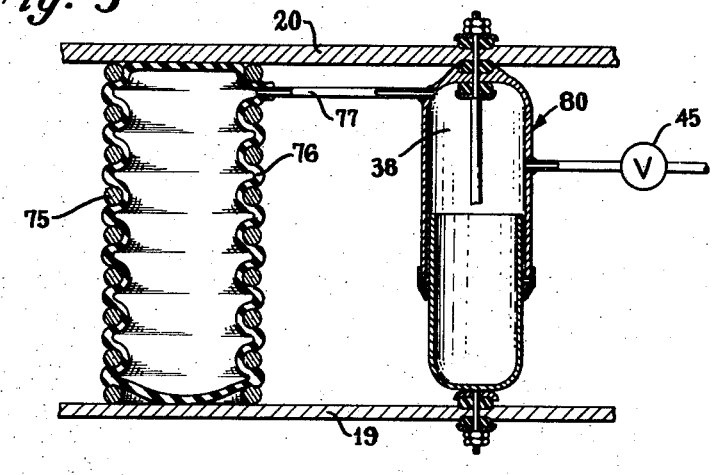
FIGURE 3 is a view in vertical section of an installation embodying the use of a mechanical spring suspension, a pneumatic suspension, and a regulator of the type described and as illustrated in FIGURE 1a or 2a of the drawings.

One particularly simple and convenient embodiment of this proposed arrangement is to employ a main suspension spring in the form of a helical spring, such as indicated at 75 in FIGURE 3 of the drawings and installing a balloon 76 within the spring, the balloon being constructed with flexible walls, for example, rubber, and the interior being connected by means of the hose or pipe 77 with the chamber 38 of the device 80 which may be of the construction either of the form shown in FIGURE 1a or of the arrangement illustrated in FIGURE 2a of the drawings.

Then the installation as shown schematically in FIGURE 3 will provide suspension means between the wheel mounting 19 and the chassis 20 which consists of three springs, the action of which is cumulative; on the one hand, the metal spring 75 assuring the suspension of the car when empty, and on the other hand, the pneumatic springs 76 and 80 for compensating for increase in load. The illustrated arrangement being diagrammatic and generic, it is apparent that the pneumatic spring 76 could take other shapes as could also the main metal spring 75. In fact, there are already non-helical springs which are covered with rubber so as to form an inner compartment into which compressed air could be introduced. Such springs are useful in the combination provided by the present invention.

Figure 4:
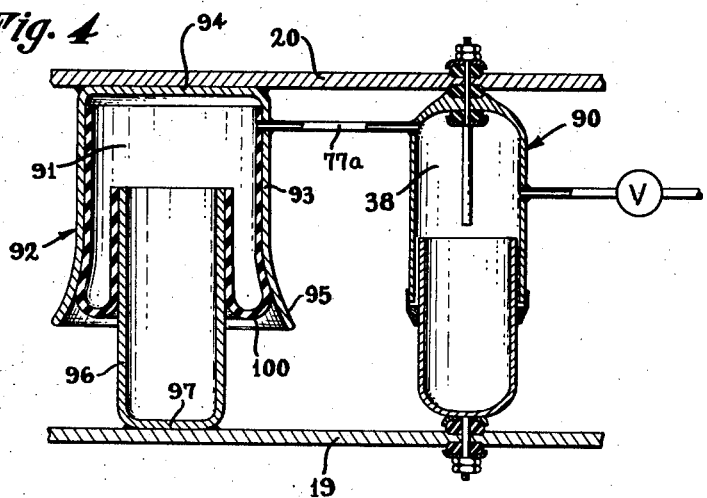
FIGURE 4 is a similar view showing the device employed in connection with a pneumatic unrolling-diaphragm supporting spring device.

Finally, the embodiment shown in FIGURE 4 of the drawings employs a compensating suspension member shown at 90 which can take the form of that illustrated in FIGURE 1a or the one illustrated in FIGURE 2a, chamber 38 therein being connected by means of the pipe or hose 77a to the interior of the chamber 91 of the unrolling diaphragm spring pneumatic device indicated generally by the reference numeral 92. This device consists of the outer bell member 93 which has its upper end 94 secured as by welding to the chassis or body 20 and its lower open end flared somewhat as at 95. This bell 93 embraces a cylinder 96 which has its bottom wall 97 secured to the wheel mounting 19. The tubular everted diaphragm 100 has one of its ends secured within the upper end of the bell 93 and its other end secured to the outer wall of the cylinder 96 near the upper end of the latter. It is obvious that the diaphragm 100 will roll and unroll as the parts 93 and 96 move with relation to each other and the compressed air within the diaphragm will afford a pneumatic suspension member similar to the one shown at 75, 76 in FIGURE 3.

In order to increase the flexibility of the device itself, it might be desired, in one or the other of the above described arrangements, to increase the volume of the compressed air in the chamber 38, 39 by placing it in free communication, for instance, by means of a flexible hose, with an auxiliary compartment (not shown).

The principles of the present invention could well be applied to the suspension of a passenger seat with respect to the frame of the vehicle, in particular under the conditions which are described in my French Patent 1,150,026.

It might also be mentioned that the valve device controlling the admission and the discharge of the compressed gas which has been described above and is illustrated in FIGURE 1a of the drawings, could also be used to control the flow of oil as in the case of my prior United States Patent 2,982,538, granted May 2, 1961.

It is understood that various changes can be made in the embodiments illustrated and described herein without departing from the scope of the invention as defined by the following claims.

Having thus described the invention, what is claimed as new and desired to be secured by Letters Patent is:

1. A pneumatic device for the automatic compensation for variations in load in an elastic suspension such as, for example, for use in a motor vehicle in maintaining substantially constant the mean height of the body or chassis above the ground, whatever the load; said device comprising a collapsible casing connected at its respective upper and lower ends with the relatively movable parts of the suspension, the casing comprising a pair of telescoping inner and outer cylindrical members having respective outer and inner walls axially movable in proximity to each other, sealing means between the inner wall of the outer member and the outer wall of the inner member to provide within the collapsible casing a chamber of variable volume containing compressible pneumatic fluid subjected at all times to the load on the suspension; a fluid inlet passageway through the wall of the outer cylindrical member giving access from a source of gaseous fluid under pressure, and a fluid outlet passage for venting the chamber; means whereby the relative positions of the two telescoping cylindrical members under variable loading conditions control the passage of fluid into and out of the chamber through the respective passageways, said means operable upon compression of the pair of cylindrical members beyond a predetermined point to admit gaseous fluid to extend the casing toward a mean position, said means being operative upon extension of said casing beyond a predetermined point to vent gaseous fluid to permit the cylindrical members to contract toward a mean position; said last named means comprising, with respect to said inlet passageway, an annular valve seat surrounding the opening of the inlet passageway in said outer wall, a valve element within the opening and movable toward and from said seat, a spring in said passageway urging said valve element toward said seat with a portion of said element projecting into the chamber in the path of a part of the inner member, whereby said valve element is displaced back into the opening of the inlet passageway and off of its seat against the urging of the spring to admit fluid under pressure through said opening past said valve into said chamber.

2. The pneumatic device for the automatic compensation for variations in load as set forth in claim 1 in which the said inlet passageway opening is disposed inwardly of the outer member beyond the inner end of the inner member in normal closed condition, and the part of the inner member which contacts and displaces said valve is the said inner end portion thereof; and in which a groove is formed in the inner wall of the outer member in communication with the valve controlled inlet opening and extending for a distance inwardly of the outer member and in the direction of inward travel of the inner member, to permit entrance of pressure fluid even though part of the inner member overruns the inlet opening.

3. The pneumatic device for the automatic compensation for variations in load as set forth in claim 1 in which there are but one inlet and but one outlet passageway and said inlet and outlet passageways are the only openings into said chamber.

4. The pneumatic device for the automatic compensation for variations in load as set forth in claim 2 in which said inner cylindrical member is provided with an annular piston head, the outer surface of said piston head having sliding contact with the inner wall of said outer member, at least one passageway through said piston head through which fluid may pass from one end thereof to the other; the said fluid inlet opening normally disposed inwardly beyond the inner end of said piston head and the said fluid outlet opening normally disposed on the opposite side of the piston head, the outlet passageway provided with a projecting spring-pressed valve element constructed and controlling its opening in the same manner as said outlet valve, the respective inner and outer ends of said piston head adapted to abut and open said valve upon reciprocation in the respective directions.

5. An elastic suspension system such as, for example, for use in a motor vehicle in maintaining substantially constant the mean height of the body or chassis above the ground, whatever the load; said suspension including a pneumatic device for the automatic compensation for variations in load, said device comprising a collapsible casing connected at its respective upper and lower ends with the relatively movable parts of the suspension, the casing comprising a pair of telescoping inner and outer cylindrical members having respective outer and inner cylindrical walls axially movable in proximity to each other, sealing means between the inner wall of the outer member and the outer wall of the inner member to provide within the collapsible casing a chamber of variable volume containing compressible pneumatic fluid subjected at all times to the load on the suspension; a fluid inlet passageway through the cylindrical wall of the outer cylindrical member giving access from a source of gaseous fluid under pressure, and a fluid outlet passageway for venting the chamber; means whereby the relative positions of overlap of the two telescoping cylindrical members under variable loading conditions directly control the passage of fluid into and out of the chamber through the respective passageways, said means operable upon compression of the pair of cylindrical members beyond a predetermined point to admit gaseous fluid to extend the casing toward a mean position, said means being operative upon extension of said casing beyond a predetermined point to vent gaseous fluid to permit the cylindrical members to contract toward a mean position; said suspension also including a metal suspension spring and a pneumatic spring device, said pneumatic device being connected between the two relatively movable members of the motor vehicle in parallel with said metal spring and pneumatic spring device, said first named pneumatic device thus constituting a resilient load-sustaining instrumentality supplementing the other suspension elements, said metal spring being a coil spring and the pneumatic spring device comprising a flexible-walled balloon disposed within said coil spring, and a conduit connecting said balloon with the chamber of said pneumatic device to supply gaseous fluid pressure from the latter to said balloon, whereby its inflation is controlled by the valving of said pneumatic device.

References Cited in the file of this patent

UNITED STATES PATENTS

| | | | |
|---|---|---|---|
| 1,105,805 | Liebowitz | Aug. 4, | 1914 |
| 1,755,436 | Faudi | Apr. 22, | 1930 |
| 2,249,530 | Kollsman | July 15, | 1941 |
| 2,790,650 | Baschi | Apr. 30, | 1957 |
| 2,982,538 | Bourcier de Carbon | May 2, | 1961 |
| 2,984,476 | Turner | May 16, | 1961 |
| 2,991,092 | Mackay | July 4, | 1961 |

FOREIGN PATENTS

| | | | |
|---|---|---|---|
| 217,855 | Australia | Feb. 7, | 1957 |
| 1,161,423 | France | Aug. 29, | 1958 |
| 943,687 | Germany | May 25, | 1956 |
| 1,091,881 | Germany | Oct. 27, | 1960 |
| 861,127 | Great Britain | Feb. 15, | 1961 |
| 888,071 | Great Britain | June 24, | 1962 |